US011728901B2

(12) United States Patent
Kowalevicz et al.

(10) Patent No.: US 11,728,901 B2
(45) Date of Patent: Aug. 15, 2023

(54) METHOD FOR NON-LINE-OF-SIGHT DETECTION OF COMPLEX OPTICAL SIGNALS

(71) Applicant: RAYTHEON COMPANY, Waltham, MA (US)

(72) Inventors: Andrew Kowalevicz, Arlington, VA (US); Benjamin P. Dolgin, Alexandria, VA (US); Gary M. Graceffo, Burke, VA (US); Jae H. Kyung, Redondo Beach, CA (US); Maurice J. Halmos, Encino, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/717,763

(22) Filed: Apr. 11, 2022

(65) Prior Publication Data
US 2022/0329326 A1    Oct. 13, 2022

Related U.S. Application Data

(60) Provisional application No. 63/172,779, filed on Apr. 9, 2021.

(51) Int. Cl.
*H04B 10/69* (2013.01)

(52) U.S. Cl.
CPC .................. *H04B 10/6911* (2013.01)

(58) Field of Classification Search
None
See application file for complete search history.

(56) References Cited

U.S. PATENT DOCUMENTS

| 4,829,532 | A  | * | 5/1989 | Kane | H01S 3/102 |
|           |    |   |        |      | 372/66 |
| 9,973,281 | B2 | * | 5/2018 | Kowalevicz | G02B 17/004 |
| 10,862,586 | B1 |   | 12/2020 | Searcy et al. | |
| 2008/0310847 | A1 | * | 12/2008 | Shpantzer | H04B 10/1121 |
|           |    |   |        |      | 398/115 |
| 2009/0142053 | A1 | * | 6/2009 | Varshneya | G01S 7/484 |
|           |    |   |        |      | 398/33 |
| 2009/0232500 | A1 | * | 9/2009 | Villarruel | H04J 14/0282 |
|           |    |   |        |      | 398/65 |
| 2013/0089333 | A1 | * | 4/2013 | Shen | H04B 10/572 |
|           |    |   |        |      | 398/79 |

(Continued)

OTHER PUBLICATIONS

International Search Report for application PCT/US2022/024056 dated Aug. 3, 2022.

*Primary Examiner* — David W Lambert
(74) *Attorney, Agent, or Firm* — Lando & Anastasi, LLP (57) ABSTRACT

Optical signal receivers, systems, and methods of operating the same include a non-line of sight optical signal receiver configured to receive and detect a complex modulated optical signal through a non-line of site propagation path from an optical transmitter, comprising an optical resonator configured to receive the complex modulated optical signal through the non-line of sight propagation path, and to convert the complex modulated optical signal to an intensity modulated signal, and a detector configured to convert the intensity modulated signal into an electrical signal, the electrical signal having an amplitude indicative of an intensity of the intensity modulated signal from the optical resonator, and to provide a detected signal.

20 Claims, 8 Drawing Sheets

(56) References Cited

U.S. PATENT DOCUMENTS

2013/0114964 A1\* 5/2013 Paral ................... B61L 15/0036
398/115
2019/0305853 A1\* 10/2019 Dolgin ...................... G02F 1/09

\* cited by examiner

METHOD FOR NON-LINE-OF-SIGHT DETECTION OF COMPLEX OPTICAL SIGNALS

CROSS REFERENCE TO RELATED APPLICATIONS

This application claims priority under 35 USC § 119(e) to U.S. Provisional Patent Application Ser. No. 63/172,779, titled "METHOD FOR NON-LINE-OF-SIGHT DETECTION OF COMPLEX OPTICAL SIGNALS," filed Apr. 9, 2021, which is incorporated by reference herein in its entirety for all purposes.

BACKGROUND

Light waves may be made to carry information by modulating a light source, often a laser source, to change various properties of the light, such as its amplitude, phase, frequency, wavelength, etc. The light waves may be in the visible spectral band, the infrared spectral band, or another region of the electromagnetic spectrum. Optical receivers receive the light waves and measure properties or variations of the light wave, such as the amplitude, phase transitions, and the like, from which the underlying signal and the information may be recovered.

An optical receiver for modulated light waves should collect a signal from a large enough area that the acquired signal power is high enough for accurate detection. Wavefront correction may be required in conventional light-focusing systems, e.g., if the light rays have propagated through varying media along the way, or were skewed, delayed, aberrated, or the like, as is typical for light waves traveling some distance through the atmosphere. Such systems may use adaptive optics to attempt to correct the light rays to their original phase relationships, but such systems are complex, fragile, and costly.

Optical signals with coherent/complex modulation have traditionally required single-mode fiber for optical transport and demodulation purposes. This limits receiver configuration flexibility and establishes a requirement to use equipment with precision tolerances that increase costs. In certain other applications, such as free-space optical communication, additional hardware is also needed to meet this demand.

To transport complex optical signals in any non-line of sight (NLOS) application has required single-mode optical fiber (SMF). This demand is met in two ways. For fiber-based communication, the signal is generally generated and maintained in single mode fiber from transmitter to receiver. In the case that it is launched into free space, the wavefront is maintained to allow for efficient coupling back into the small single mode fiber diameter needed for single mode propagation. For truly free-space communication systems, where wavefront distortion occurs, adaptive optics systems have been used at the collection aperture. Adaptive optics systems correct for aberrations of the beam and allow for efficient coupling to single mode fiber for transport and demodulation. Both of these approaches limit the design of the receiver and/or add cost/complexity to the systems.

SUMMARY

According to at least one aspect, a non-line of sight optical signal receiver configured to receive and detect a complex modulated optical signal through a non-line of site propagation path from an optical transmitter is provided, the receiver comprising an optical resonator configured to receive the complex modulated optical signal through the non-line of sight propagation path, and to convert the complex modulated optical signal to an intensity modulated signal, and a detector configured to convert the intensity modulated signal into an electrical signal, the electrical signal having an amplitude indicative of an intensity of the intensity modulated signal from the optical resonator, and to provide a detected signal.

In one example, the optical receiver is implemented without one or more of a single mode fiber and adaptive focusing optics, and the optical resonator enables demodulation of complex modulated optical signals with wavefront distortion without any local oscillators or mixers for measuring a phase change of the complex modulated optical signal.

In another example, the complex modulated optical signal is a phase modulated optical signal, and the optical resonator is an etalon configured to convert the phase modulated optical signal to the intensity modulated signal.

In one example, the optical signal receiver further comprises a tuning controller configured to tune the optical resonator by altering a temperature of air in or around the optical resonator causing an optical thickness of the optical resonator to change, altering a temperature of a material in the optical resonator causing the optical thickness of the optical resonator to change, rotating the optical resonator to alter the optical thickness, applying a voltage to an electro-optic material in the optical resonator to alter the index of refraction of the electro-optic material, applying a voltage to one or more piezo elements that change in length to thereby change a cavity length of the optical resonator, and/or changing the cavity length by a mechanical movement or an application of pressure applied to one or more semi-reflective surfaces of the optical resonator.

In another example, the optical signal receiver further comprises a receive telescope configured to receive the complex modulated optical signal from the optical transmitter through the non-line of site propagation path, the optical resonator further configured to receive the complex modulated optical signal from the receive telescope.

In one example, the optical signal receiver further comprises a polarizing beam splitter configured to transmit the complex modulated optical signal towards the optical resonator and reflect the intensity modulated optical signal from the optical resonator towards the detector.

In another example, the optical signal receiver further comprising at least one dispersive optics element configured to receive the reflected intensity modulated optical signal from the optical resonator and disperse energy in the intensity modulated optical signal as a dispersed optical signal, wherein the detector is further configured to convert the dispersed optical signal into the electrical signal.

In one example, the at least one dispersive optics element includes a diffraction grating having a spacing at the free spectral range of the optical resonator.

In another example, the at least one dispersive optics element includes at least one dispersing prism.

According to at least one aspect, a non-line of sight optical system is provided that comprises the optical signal receiver and the optical transmitter.

In one example, the optical transmitter comprises one or more wavelength master oscillators and one or more wavelength dispersive optical devices.

In another example the optical transmitter comprises an optical source configured to provide an optical signal, at least one electro-optic modulator configured to receive the de-multiplexed optical signal and modulate an amplitude of the optical signal, a phase modulator configured to modulate a phase of the amplitude-modulated optical signal, an optical amplifier configured to amplify the power of the phase-modulated optical signal, and a transmit telescope configured to receive the amplified optical signal and transmit the complex modulated optical signal through the non-line of site propagation path.

In one example, the optical signal receiver is further configured to receive and detect an optical signal from a scatterer, the optical transmitter being co-located with the optical signal receiver.

In another example, the non-line of sight optical signal receiver further comprises a controller configured to calculate a distance from the optical signal receiver to the scatterer based on a correlation between the detected optical signal received from the scatterer and known modulated waveform.

According to at least one aspect, a method of detecting a complex modulated optical signal through a non-line of site propagation path is provided, the method comprising receiving, at an optical resonator, the complex modulated optical signal through the non-line of sight propagation path from an optical transmitter, converting the complex modulated optical signal to an intensity modulated signal, receiving the intensity modulated optical signal at a detector, converting the intensity modulated optical signal into an electrical signal, the electrical signal having an amplitude indicative of an intensity of the intensity modulated signal from the optical resonator, and providing a detected signal.

In one example, the optical resonator is an etalon that demodulates one or more complex modulated optical signals with wavefront distortion without any local oscillators or mixers for measuring a phase change of the complex modulated optical signal.

In another example, the method further comprises tuning the optical resonator by altering a temperature of air in or around the optical resonator causing an optical thickness of the optical resonator to change, altering a temperature of a material in the optical resonator causing the optical thickness of the optical resonator to change, rotating the optical resonator to alter the optical thickness, applying a voltage to an electro-optic material in the optical resonator to alter the index of refraction of the electro-optic material, applying a voltage to one or more piezo elements that change in length to thereby change a cavity length of the optical resonator, and/or changing the cavity length by a mechanical movement or an application of pressure applied to one or more semi-reflective surfaces of the optical resonator.

In one example, the method further comprises transmitting, by a polarizing beam splitter, the complex modulated optical signal towards the optical resonator, and reflecting, with the polarizing beam splitter, the intensity modulated optical signal from the optical resonator towards the detector.

In another example, the method further comprises receiving the reflected intensity modulated optical signal from the optical resonator, dispersing energy in the intensity modulated optical signal as a dispersed optical signal, and converting the dispersed optical signal into the electrical signal.

In one example, the method further comprises transmitting, by the optical transmitter being co-located with the optical signal receiver, an optical signal, receiving and detecting the optical signal, and calculating a distance from the optical signal receiver to a scatterer based on a time of delay between the second optical transmitter transmitting the optical signal and the optical signal receiver receiving the signal.

Still other aspects, embodiments, and advantages of these exemplary aspects and examples are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and examples described herein may also include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. For purposes of clarity, not every component may be labeled in every figure. In the figures.

DETAILED DESCRIPTION

High bit rate approaches to free space optical communication often use a phase-shift keying modulation format, in part because it allows improvement in signal-to-noise ratio (SNR), typically on the order of 2-3 dB, as compared to direct detection of intensity modulations. Because information is encoded in the phase of the optical signal(s), wavefront aberrations (e.g., variations) on the order of a fraction of a wavelength can cause significant destructive interference (e.g., signal fading) when such optical signals are focused, e.g., for coupling into an optical fiber. Traditionally wavefront correction has been used to remove aberrations and allows non-destructive focusing of the optical signal into a single mode fiber, from which the signal may be demodulated by any number of coherent techniques. In these cases, adaptive optics (AO) are conventionally used to perform wavefront correction. For example, AO may utilize a deformable mirror surface with any number of wavefront sensors, such as a Shack-Hartmann sensor or a self-referencing interferometer. With feedback control, such systems can correct deviations of several microns at a rate of tens of thousands of corrections per second. But such systems are expensive, complex, and fragile.

Traditionally for fiber and free-space optical communication, single mode fiber (SMF) has been used exclusively for transporting complex, e.g., phase modulated, optical signals and adaptive optics systems are used to correct for wavefront distortion so that the incoming signal can be coupled to single mode fiber for demodulation. Such traditional optical signal detection systems for complex optical signals typically either measure the optical phase with an optical mixer with respect to a local oscillator, or with respect to the signal itself. In neither of these cases would a multimode waveguide work for transporting the complex optical signal. In the first case, the many modes provided by a multimode waveguide would present a complex modulated optical signal with many different relative phases compared to the local oscillator, which would also acquire different phases and intensity in the mixing process, rendering such a measurement useless, and giving equal output from the two ports of the mixer before and after a phase change. The alternative approach, self-mixing, requires that the path length for all modes be the same, but that situation explicitly does not hold for a multimode waveguide, where modal dispersion gives each mode a different propagation constant. As a result, one could not verify that the phase coherence was maintained in the multimode waveguide.

For the purposes of this disclosure, and as will be understood by those of skill in the art, the terms light, light signal, laser beam, and optical signal may be used interchangeably herein and refer generally to an electromagnetic signal that propagates through a given medium, which may be empty space, e.g., a vacuum, or may be an atmospheric, e.g., air, or other medium, such as fiber (including multimode fiber) or other optics components. The terms light, light signal, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other electromagnetic radiation conventionally processed in the field of optics.

If a free space optical (FSO) signal is injected into a multimode waveguide (e.g., a multimode optical fiber), the fiber introduces very large dispersions that are added to the wavefront perturbations that are acquired on the way from transmitter to receiver. Thus, the concept of a phase of the light signal in the multimode waveguide simply does not exist; each mode has its own phase that is very different from the phase of the other modes. Thus, conventional receivers that measure (or compare) phase before the phase transition with the phase after the phase transition will fail because there is no phase to measure.

Line-of-sight (LOS) propagation is a characteristic of electromagnetic radiation or acoustic wave propagation where waves travel in a direct path from the source to the receiver. FM radio, microwave, and satellite transmission are examples of line-of-sight communication. Conventional LOS optical receivers and communication systems require a direct path between the transmitter and receiver.

Non line-of-sight (NLOS) propagation occurs outside of the typical line of sight (LOS) between the transmitter and receiver. Previous approaches to mitigating the effects of scattering objects in a NLOS propagation path between an optical transmitter and an optical receiver include adaptive optics to correct for wavefront distortion correction and local oscillators for heterodyne mixing. Such approaches may also require time synchronization and relative motion compensation.

Embodiments described herein provide an approach for NLOS detection of complex signals without the need for single-mode-fiber (SMF), adaptive optics, or local oscillators. These savings and benefits are achieved by leveraging an etalon's high tolerance to wavefront distortion. Additional embodiments include using the etalon to implement NLOS detection of complex optical signals in LIDAR and LADAR applications.

RADAR, which stands for RAdio Detection And Ranging, uses a transmitted radio signal aimed by an antenna in a particular direction, and a receiver that detects the echoes off any objects in the path of the signal. The reflected signals can be used to locate and track objects. LIDAR, which stands for LIght Detection And Ranging, and LADAR, which stands for LAser raDAR, are related remote sensing techniques. Though similar in overall technique, LIDAR is typically utilized for terrain or atmospheric mapping applications, whereas LADAR is used for target sensing applications that may encompass multiple functions such as ranging, velocity estimation, coherent imaging, and communications. It is understood discussion herein of one of LADAR and LIDAR applies to both techniques.

Optical systems described herein include mono-static, bi-static, and multi-static optical system configurations. In a mono-static configuration, the transmitter and receiver are both co-located (i.e., at the same location). In a bi-static configuration, the transmitter and receiver are separated by a distance that is comparable to the expected target distance. A multi-static configuration includes multiple spatially diverse mono-static or bi-static configurations with a common/shared area of coverage. Embodiments described herein utilize each of these configurations and are tolerant to wavefront aberrations without the need for local oscillators or mixers.

Figure 1:
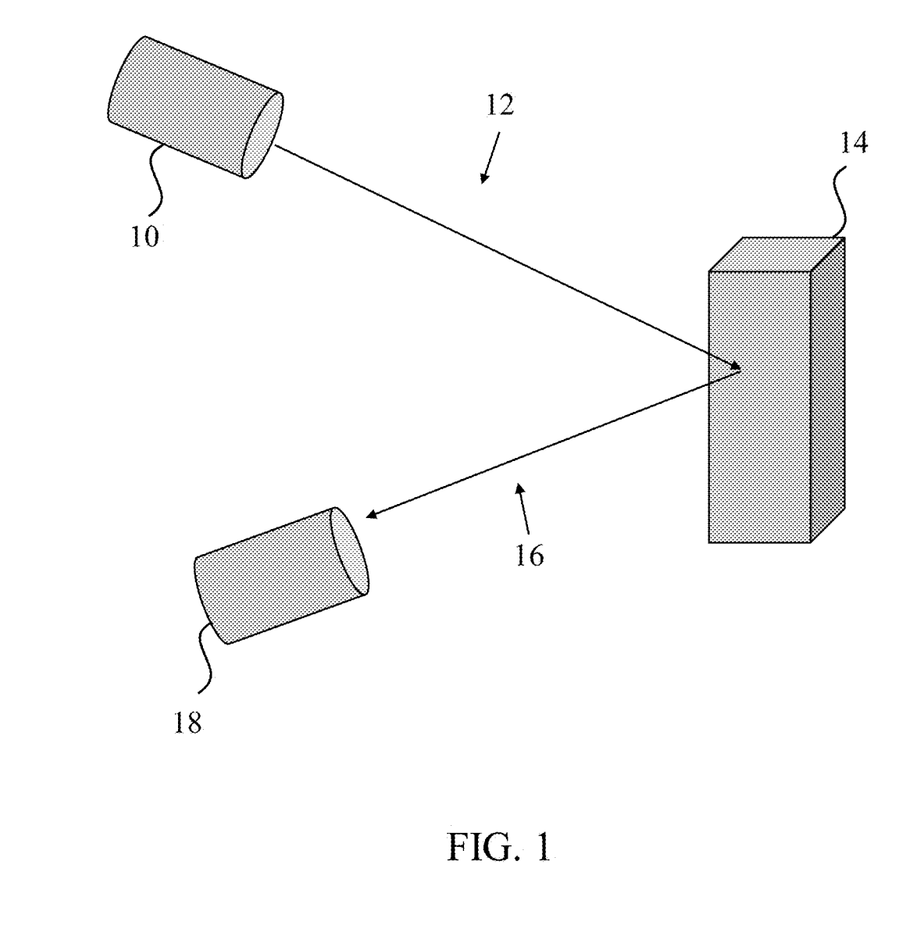
FIG. 1 is a schematic diagram of a non-line of sight propagation path between an optical transmitter and an optical receiver according to various examples described herein.

FIG. 1 illustrates an example scenario where such wavefront aberrations are formed when an optical transmitter 10 transmits a complex modulated optical signal along a first path 12. The transmitted optical signal encounters an object 14 and undergoes specular reflection, causing the optical signal to be reflected along a second path 16 towards a receiver 18, thereby forming a NLOS propagation path from the optical transmitter 10. In some scenarios, the specular reflection causes a change in frequency of the optical signal. The optical signal may sustain further wavefront distortion due to turbulence in the propagation medium.

Figure 2:
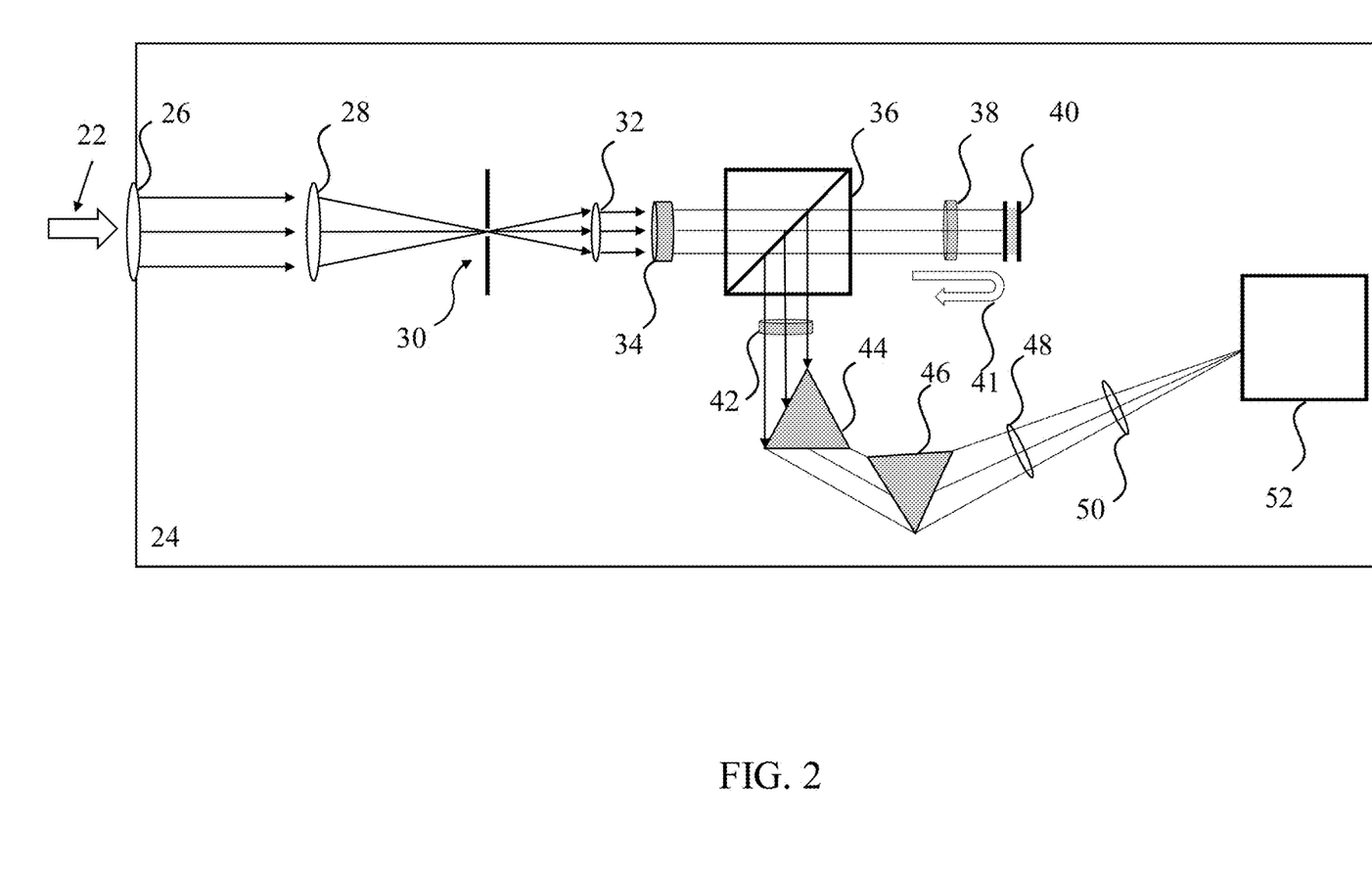
FIG. 2 is a schematic diagram of an optical receiver according to various examples described herein.

FIG. 2 is a schematic diagram of a non-line of sight optical signal receiver 24 (e.g., similar to the receiver 18) according to various examples described herein. The receiver 24 is configured to receive and detect an incoming complex modulated optical signal 22 through a non-line of site propagation path from an optical transmitter (e.g., the optical transmitter 10). The incoming signal 22 encounters an entrance pupil 26, which is optically coupled to a first lens 28, a field stop 30, a second lens 32, a filter 34, a polarizing beam splitter 36, a first waveplate 38, an optical resonator 40, a second waveplate 42, a first dispersing prism 44, a second dispersing prism 46, a third lens 48, a fourth lens 50, and a detector 52.

According to certain aspects, the optical signal receiver 24 is configured to detect information encoded on a plurality of different wavelengths in the incoming optical signal 22. As the optical signal 22 propagates towards the receiver 24, the signal 22 first reaches the entrance pupil 26. After the optical signal 22 passes through the entrance pupil 26, the signal 22 encounters the first lens 28, which focuses the light toward the field stop 30. The field stop 30 is an optical element that limits the field of view of the optical receiver 24. In certain embodiments, the field stop 30 and the first lens 28 are included in a telescope. As the optical signal 22 passes through the field stop 30, the signal 22 encounters the second lens 32 and then the filter 34. The polarizing beam splitter 36 is configured to transmit the optical signal 22 toward the first waveplate 38 and optical resonator 40. The optical resonator 40, in certain embodiments, is configured to convert a phase-modulated complex optical signal to an intensity-modulated optical signal, which may be transmitted through and/or reflected by the optical resonator 40 as a reflected signal 41. The reflected signal 41 passes back through the first waveplate 38 and is reflected by the polarizing beam splitter 36 towards the second waveplate 42. After encountering the second waveplate 42, the reflected signal 41 encounters the first dispersing prism 44 and then from the first dispersion prism 44, the reflected signal 41 encounters the second dispersing prism 46, the third lens 48, the fifth lens 50, and then the detector 52. In certain examples, the detector 52 is optically coupled to the fifth lens via an optical fiber bundle.

In one example of the optical receiver 24, the entrance pupil 26 has a diameter of 1.80 inches, the first lens 28 has a focal length of 300 mm and a diameter of 2 inches, the telescope formed by the first lens 28 and the field stop 30 are included in a telescope with 2.4× magnification, the second lens 32 has a focal length of 125 mm, and the filter 34 is a bandpass filter configured to pass four different wavelengths in the incoming optical signal 22. Continuing with this example, the first waveplate 38 is a quarter-wave plate, the optical resonator 40 is an etalon, the second waveplate 42 is a half-wave plate, the dispersing prisms 44, 46 are made of NSF11 glass with a dispersion of about 0.0733 mrad/nm, the third lens 48 has a focal length of 500 mm, and the fourth lens 50 has a focal length of 500 mm. In at least one embodiment of the optical receiver 24, the excess fiber length (EFL) is about 369.5 mm. It is understood that this example is non-limiting, and other embodiments where one or more of the elements of the receiver 24 are altered or substituted are included herein.

NLOS optical signal receivers described above are included in embodiments where an optical receiver and an optical transmitter are co-located (i.e., at the same location) and embodiments where an optical receiver and an optical transmitter are not co-located (i.e., separated). In each of these embodiments, an object (e.g., the object 14) acts as a scatterer that redirects an optical signal along an NLOS propagation path between the transmitter and the receiver (e.g., the transmitter 10 and the receiver 18 or the receiver 24). Other embodiments include a combination of one or more co-located optical systems with one or more non-co-located optical systems.

Figure 3:
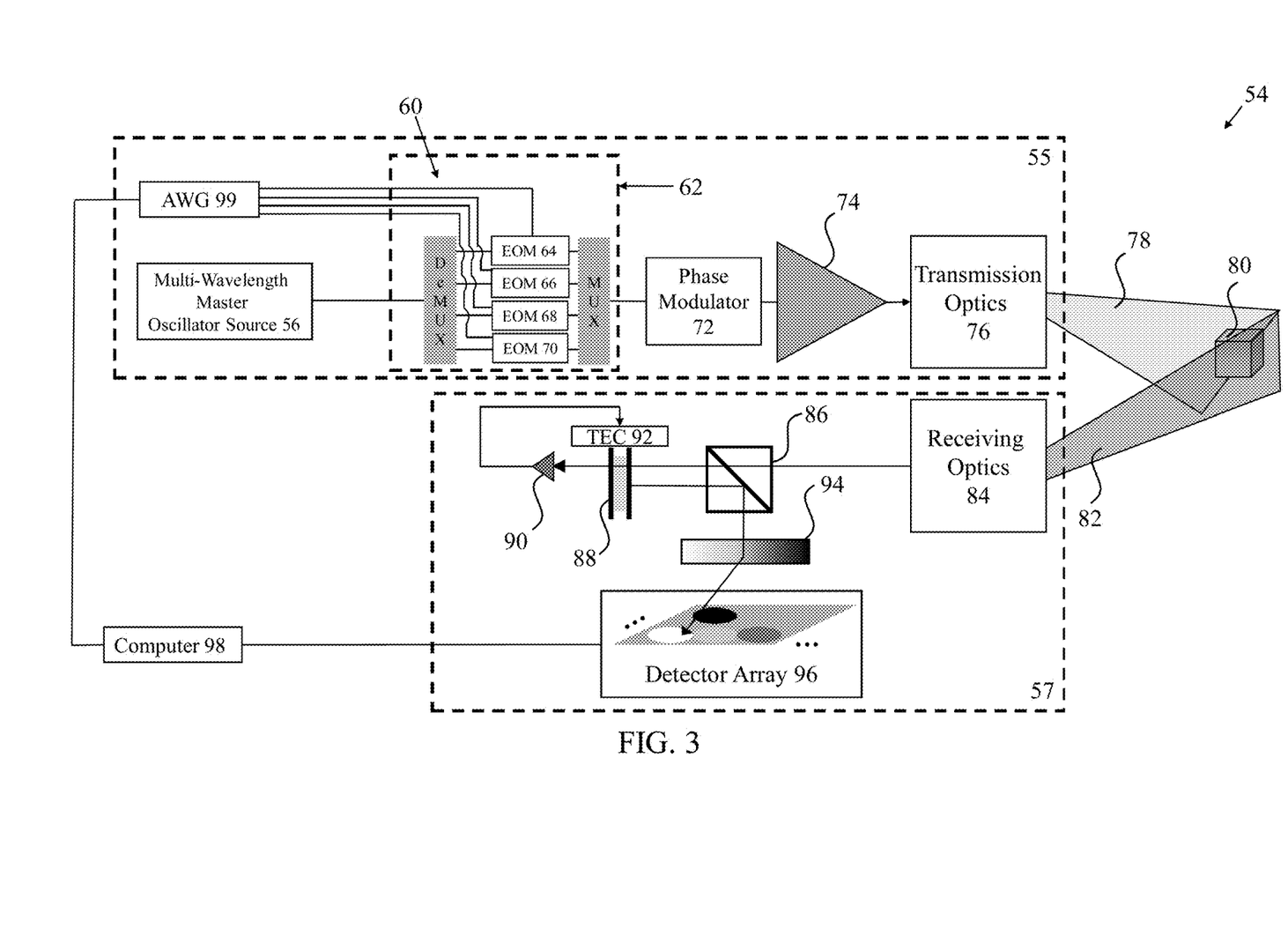
FIG. 3 is a schematic diagram of an optical system according to various examples described herein.

FIG. 3 is a schematic diagram of an optical system generally indicated at 54. The optical system 54 includes an optical transmitter 55 and an optical receiver 57. The optical transmitter 55 and the optical receiver 57, in some examples, are co-located as part of a transceiver. In other examples, the optical transmitter 55 and the optical receiver 57 are not co-located. In some examples, the optical transmitter 55 and the optical receiver 57 are not co-located but may each be part of a separate transceiver. As described above, it is understood that embodiments described herein include optical systems, including the system 54, that operate in tandem with one or more additional optical systems which receive an optical signal from the system 54 and which may or may not be not co-located with the system 54. The system 54 is configured to determine a distance between a scatterer 80 and one or both of the transmitter 55 and the receiver 57.

The optical transmitter 55 includes a multi-wavelength master oscillation source 56, a demultiplexer/multiplexer assembly 62 that includes a plurality of electro-optic modulators (EOM) 64, 66, 68, and 70, a phase modulator 72, an optical amplifier 74, and transmission optics 76.

Each of the individual wavelengths is provided to a respective EOM, which is driven by an Arbitrary Waveform Guide 99 (AWG). The AWG 99 is coupled to the computer 98, such that the computer 98 receives data from a detector array 96 and instructs the AWG 99 how to drive each EOM 64, 66, 68, 70. In certain examples, the computer 98 and AWG 99 are part of a single computer. In an example, a first wavelength is provided to the electro-optic modulator 64, a second wavelength is provided to the electro-optic modulator 66, a third wavelength is provided to the electro-optic modulator 68, and a fourth wavelength is provided to the electro-optic modulator 70. It is understood that the number of wavelengths produced by the oscillator source 56 and the corresponding number of EOMs may vary to any number.

The optical receiver 57 includes receiving optics 84, a polarizing beam splitter 86, an optical resonator 88, an optical amplifier 90, a thermoelectric cooler 92, a diffraction grating 94, and the detector array 96. In certain examples, the resonator 88 is an etalon. The transmitter 55 receives data from the receiver 57 via a computer 98, which is coupled between the detector array 96 and the AWG 99. The computer 98, in certain examples, includes a data recorder and a Timing, Acquisition, and Control (TAC) computer. To determine ranging information from the scatterer 80, the transmitter 55 emits an optical signal in a transmission field of view 78. The optical signal encounters the scatterer 80 and is redirected towards the receiver 57 along a NLOS propagation path with the transmitter 55.

The optical system 54 is configured to transmit an optical signal including four different wavelengths produced by the multi-wavelength master oscillator source 56. The master oscillator 56 produces a highly coherent beam including a plurality of wavelengths. The plurality of wavelengths is de-multiplexed by the assembly 62. Each of the individual wavelengths is provided to a separate EOM, which is controlled by the computer 98 via one of a plurality of channels 60. In certain examples, each of the EOMs 64, 66, 68, 70 is configured to modulate one of an amplitude, a frequency, or a phase of its input optical signal. Following modulation by the EOMs 64, 66, 68, 70, the optical signals are re-combined by a multiplexer. As described above, the de-multiplexing and multiplexing is carried out, in some examples, by an array waveguide grating. The multiplexed signal is then provided to the phase modulator 72, which modulates a phase of the multiplexed optical signal. The phase-modulated optical signal is then provided to the optical amplifier 74 to increase the power of the phase-modulated optical signal. Subsequently, the amplified signal is provided to the transmission optics 76, which direct the amplified beam into free space. In some examples, the transmission optics include a telescope or mechanical actuators to steer the transmitted optical signal towards a specific area.

The transmitted optical signal follows a NLOS propagation path between the transmitter 55 and receiver 57 by encountering scatterer 80. The receiving optics 84 received the reflected signal from the scatterer 80. In certain embodiments, the receiving optics include a telescope. The received optical signal is provided to the polarizing beam splitter 86 which is transmissive to at least the reflected signal. The reflected signal then encounters the optical resonator 88, which in certain embodiments, is an optical resonator having two parallel semi-reflective surfaces. Once energy has accumulated in the optical resonator 88, the reflected signal interacts with the accumulated energy, which converts the phase modulation to an intensity modulation.

An intensity-modulated transmitted signal is provided from the resonator 88 to an optical amplifier 90, which amplifies the transmitted signal and provides the amplified signal to the thermoelectric cooler (TEC) 92, which is used to tune the optical resonator to a specific operating point by changing the air outside the etalon and/or the temperature of a material within the etalon. In some examples, the optical amplifier 90 includes a detector. In other embodiments, to tune the resonator 88, the TEC 92 is replaced by one or more piezo elements that change in length to thereby change a cavity length of the etalon, one or more mechanical actuators to apply pressure to one or more of the semi-reflective surfaces or rotate the resonator 88 itself, or an electro-optic material located between the semi-reflective surfaces where the index of refraction of the electro-optic material is changed by applying a voltage to the material. According to certain embodiments, tuning the optical resonator 88 is carried out by the computer 98 using feedback from the detector array 96.

An intensity-modulated reflected signal is provided from the resonator 88 back to the polarizing beam splitter 86, which provides the reflected signal to the diffraction grating 94. The diffraction grating 94 is configured to separate the individual wavelengths within the intensity-modulated reflected signal and provide the separated wavelengths to the detector array 96. In some examples, the diffraction grating 94 has a spacing at the free spectral range (FSR) of the etalon. The detector array 96 outputs a signal to the computer 98 indicating a value for each separated wavelength.

Figure 4:
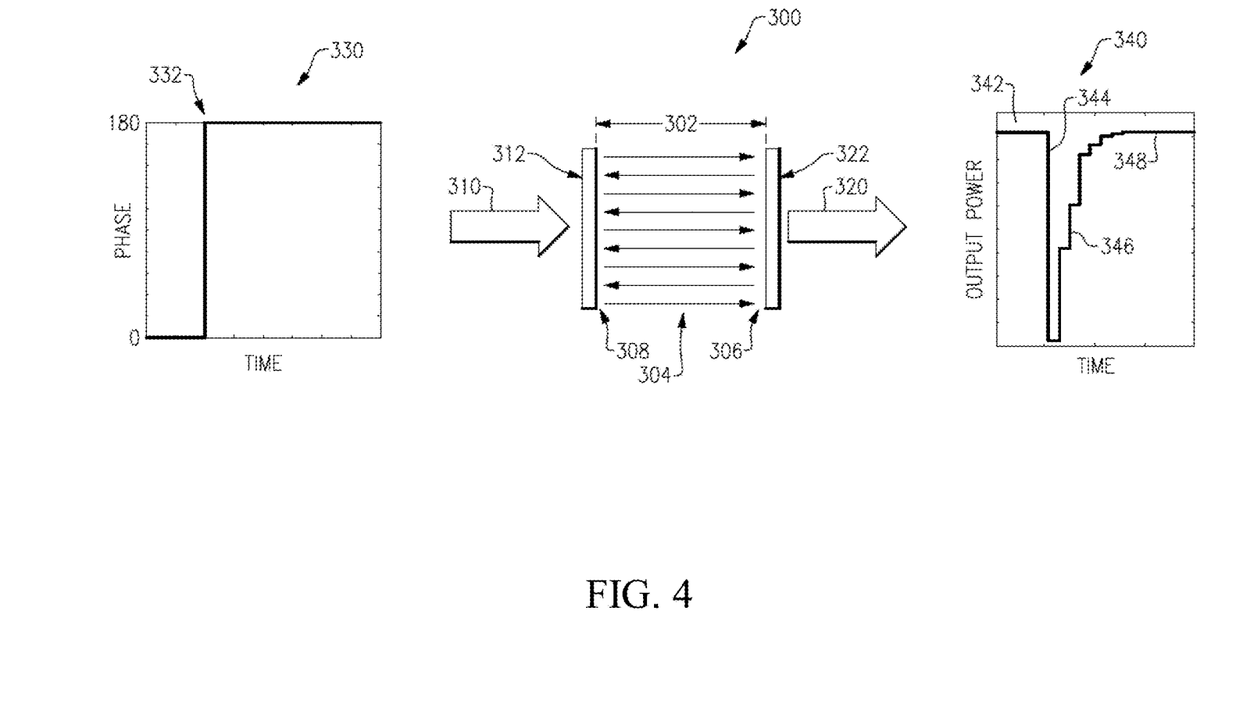
FIG. 4 is a is a schematic diagram of an example of an optical resonator, including a graph of received signal phase and a graph of output intensity of the optical resonator according to various examples described herein.

As discussed above, suitable optical resonators include etalons, and at least one example of an etalon is discussed with respect to FIG. 4, which illustrates an example of an etalon 300 which may be used in various examples of a receiver in accord with aspects and embodiments described herein, for example, as the optical resonator 40 in FIG. 2 or the optical resonator 88 in FIG. 3. In particular, a receiver may use the etalon 300 to convert complex signal modulations of a received optical communication signal 310 into intensity or amplitude modulations of an output optical signal 320. The intensity or amplitude modulated output optical signal 320 may then be converted to an electrical signal, with corresponding amplitude variations representative of the modulation of the received optical signal 310. The etalon 300 causes the received optical signal 310 to resonantly interact with itself, internal to the etalon 300, such that changes in the received optical signal 310 disrupt the resonance and cause amplitude (or intensity) variations at the output optical signal 320, which may be coupled directly to a detector.

In particular examples, the etalon 300 is designed to have a resonant frequency aligned with the source, e.g., a transmit laser, of the received optical communication signal 310. In various examples, a dimensional scale, e.g., length 302, of the etalon 300 is selected such that the etalon 300 exhibits optical resonance at the wavelength of the received optical communication signal 310. In certain examples, such dimensional scales are much shorter than the length of a transmitted symbol, which is the distance traveled by the optical signal between transitions that convey information, e.g., between phase changes in a phase modulated signal.

The etalon 300 includes an interior 304 with semi-reflective surfaces 306, 308 that reflect optical signal energy into the interior 304. An input side 312 allows optical signal energy, such as the optical communication signal 310, into the interior 304. The input side 312 thereby forms an aperture through which the arriving optical communication signal 310 is received. An output side 322 forms an optical output, at least in part by action of the semi-reflective surface 306 to allow a portion of trapped optical signal energy from the interior 304 to emerge as an output optical signal, such as the output optical signal 320. Accordingly, the semi-reflective surface 306 is also semi-transmissive, such that optical signal energy arriving (from the interior 304) at the semi-reflective surface 306 is partially reflected back to the interior 304 and partially transmitted through to the output side 322. The etalon 300 may have varying levels of reflectivity of the semi-reflective surfaces 306, 308. In certain examples, the reflectivity may be expressed as a fraction of light amplitude reflected back into the interior 304 or may be expressed as a fraction of light intensity reflected back into the interior 304. In a particular example, an amplitude reflectivity of the first semi-reflective surface 308 may be $r_1=0.999$ and an amplitude reflectivity of the second semi-reflective surface 306 may be $r_2=0.985$. In other examples the reflectivity of each of the first and second semi-reflective surfaces may be different and may be any suitable value for a particular implementation. The etalon 300 is one example of a suitable optical resonator in accord with aspects and embodiments described herein.

According to certain examples, an optical resonator, such as the etalon 300, will coherently develop an output signal based on the input signal, and maintain a given level of the output signal until a modulation in the phase of the input signal occurs. When a phase modulation occurs in the input signal, destructive interference causes a phase-dependent change in the amplitude of the output signal. This can be seen in the input phase plot 330 and the output power plot 340 illustrated in FIG. 4. Accordingly, a received phase encoded optical communication signal, such as received optical signal 310, is converted to an amplitude varying signal, such as the output optical signal 320, by the optical resonator, such as the etalon 300. The output optical signal 320 is suitable for direct detection by a sensor, such as the detector array 96 of FIG. 3. Additionally, an optical resonator will function over a broad range of data rates without the need to modify the optical characteristics of the system, such as detector setup, path length adjustments, delay elements, or the like. For example, the ability of the etalon 300 to convert an arriving phase modulated input optical signal 310 into an intensity modulated output optical signal 320 may be independent of the modulation rate at which the input phase is changing, in some examples.

The use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like.

FIG. 4 further illustrates operation of the etalon 300 with reference to the output power plot 340 of optical signal intensity (as output power) emerging from an optical resonator, such as the etalon 300, during a phase transition 332 in the received optical signal 310. At point 342 the etalon 300 is in a steady-state resonance condition wherein a steady intensity of light emerges. At point 344 a phase transition 332 occurs in the arriving optical signal 310, temporarily disrupting the steady-state and causing a change in the emerging light intensity. During successive reflections inside the etalon, labeled at point 346, resonance is being re-established and the emerging light intensity increases until, at point 348, a steady intensity of light emerges when the etalon 300 has returned to a steady-state condition.

Accordingly, variation in emerging light intensity from an optical resonator, such as the etalon 300, indicates that a transition occurred in an arriving optical signal, such as a phase, frequency, or amplitude variation, and such may be used by appropriate signal processing to determine useful information by analyzing the emerging light intensity. In the example discussed above and illustrated by FIG. 4, the arriving optical signal 310 is presumed to be phase modulated, but other examples include frequency or amplitude modulation, or any combination of these, and may cause similar variations or other detectable variations in output intensity. In some examples, higher order or more complex modulation may be accommodated by various optical resonator designs.

As a particular example, an etalon tuned to the arriving wavelength reacts to a phase variation in the arriving optical signal in accord with the discussion above and as illustrated in FIG. 4. If the arriving optical signal is modulated with binary phase shift keying (BPSK), for example, the output illustrated in FIG. 4 indicates each phase shift, and accordingly the information carried in the phase shift keying may be recovered from the intensity variations at the output optical signal 320. It should be understood by those of skill in the art with the benefit of this disclosure, that such information recovery is achieved without the necessity for a local coherent clock source or the need to support single-mode coupling, such as to a single mode fiber and delay-line interferometer, to demodulate the arriving optical signal.

In some examples, an optical resonator may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples. In an example, an optical resonator is constructed from a solid material that receives light through a first semi-reflective surface, passes the received light to at least one non-planar surface, and then to a planar surface forming a multi-sided solid device.

Using such an optical resonator for detection and demodulation allows for the signals to propagate through a highly turbulent atmosphere and be detected with little or no loss in the local coherence of the signal, allowing information to be recovered without wavefront correction. Wavefront distortions that result from propagation through a non-uniform medium may be treated similarly or the same as wavefront distortions generated by specular reflections from non-uniform surfaces. As a result, the etalon can recover phase-encoded information from static and moving surfaces, as long as the surface features changes slowly compared with the rate of change in the phase of the optical signal. Therefore, the etalon can be used to detect signals without LOS between transmitter and receiver. The implications of this capability dramatically expand the application space for the etalon. In terms of optical communication itself, use of the etalon allows for a signal to be bounced off of a wall, building, or other structure and still relay the information content to a receiver.

Embodiments herein allow for a single complex FSO, LIDAR or LADAR transmission to be detected by multiple receivers at the same time. The use of multi-static detection, enabled by the etalon-enhanced receiver, increases information content and improves situational awareness, allows for efficient detection of phase modulated signals from specular reflection, allows for detection of phase modulated signals from specular reflection without coupling to SMF, allows for detection of phase modulated signals from specular reflection without a local oscillator, allows for concurrent detection of phase modulated signals from specular reflection at several different receiver location, allows for NLOS high-speed optical communication, allows for multi-static LIDAR or LADAR with passive receiver, and allows for low-cost, low-complexity, robust phase-sensitive receivers.

One approach to determining ranging information between an optical receiver and a target object is to determine the time between the transmitter emitting the optical signal and the receiver receiving the optical signal. This value of time is multiplied by the speed of light and then the result is divided by two to determine the distance between the transmitter and the target object. There are several drawbacks to this approach. Motion of the target object and/or the imaging system (e.g., a LIDAR or LADAR system) Doppler-shifts the return signal in the receiver, so the return signal is mixed with the local oscillator signal to recover directly velocity of the target object. The requirement of a local oscillator increases complexity, cost, and the number of points of failure of the imaging platform.

As an improvement on previous LIDAR and LADAR systems, embodiments herein utilize optical systems that determine the distance to a target object, accounting for Doppler shifts in the return signal, without any local oscillators or mixers, thereby reducing cost, complexity, and opportunities for failure compared with conventional systems. To achieve this benefit, an optical transmitter (e.g., the transmitter 10 or the transmitter 55) transmits a phase-modulated optical signal carrying data on each of a plurality of different wavelengths. Upon reflection from a target object, the phase-modulated signal is received at a receiver (e.g., the receiver 18, the receiver 24, or the receiver 57) including an etalon or an optical resonator (e.g., optical resonator 40 or optical resonator 88) that includes at least two semi-reflective parallel surfaces for accumulating resonant energy therebetween. While the frequency of the phase-modulated optical signal may be altered by interacting with the target object, the phase-encoded information is still substantially unaffected.

The etalon 'averages' the optical signals it receives with carrying angles of incidence, and interacts with the accumulated optical energy, and produces an intensity-modulated signal which is detected by a detector. The encoded data, in certain examples, encodes timing information, thereby allowing a controller to decode the timing information to infer the distance to the target object. In other examples, the transmitter transmits different optical signal pulses having different phase modulation including but not limited to pseudo-random BPSK, and the distance is determined by correlating the pre-determined phase waveform with the time delay of the received pulses.

In one example, a controller is configured to calculate a distance from the optical signal receiver (e.g., the receiver 18, the receiver 24, or the receiver 57) to the scatterer based on a correlation between the detected optical signal received from the scatterer and a known modulated waveform that was transmitted. The received signal is converted to a digital signal that is cross-correlated with a pre-determined waveform that the transmitter uses to obtain relative scatterer ranging data. In some examples, the transmitted waveform is sent with header information that transmits the local time to calculate total traverse time between the transmitter to scatterer to receiver. For a co-located transmitter and receiver, the absolute range is half the total time of flight. In examples of transmitters and receivers being separated by a large distance, successive measurements in which at least one of the apertures is moved is used to disambiguate the foci of range possibilities.

An additional benefit of optical receivers described herein is the lack of a need for knowledge about the transmitted signal, which affords bi-static and multi-static configurations. To extract ranging information, in certain examples, the phase-modulation waveform that is transmitted needs to be known by the receivers. These can be pre-programmed waveforms or can be recovered by the de-modulated signal at the receiver and then applied. In an example, a phase-encoded optical signal encounters a target object and undergoes specular reflection towards two receivers that are not co-located with each other or the transmitter. Without knowing the time in which the signal left the transmitter and without having any local oscillators or mixers, each of the two optical receivers may determine the distance between the target object and each receiver.

To tune the etalon described above to a particular operating point, one or more techniques are utilized. In one example, a controller tunes the etalon by changing its operating point by altering the temperature of air in or around the etalon, or a material within the etalon, via one or more heating elements (e.g., a Peltier heater). Changing the temperature causes the optical thickness of the etalon to change, thereby changing its operating point. In another example, an electro-optic material is disposed within the etalon, and the controller applies a voltage to the electro-optic material to alter its index of refraction, and thereby change the operating point of the etalon. In one example, the controller applies a voltage to one or more piezo elements that change in length to thereby change a cavity length of the etalon. In another example, mechanical actuators apply pressure to one or both of the parallel reflective surfaces of the etalon to tune its operating point.

Figure 5:
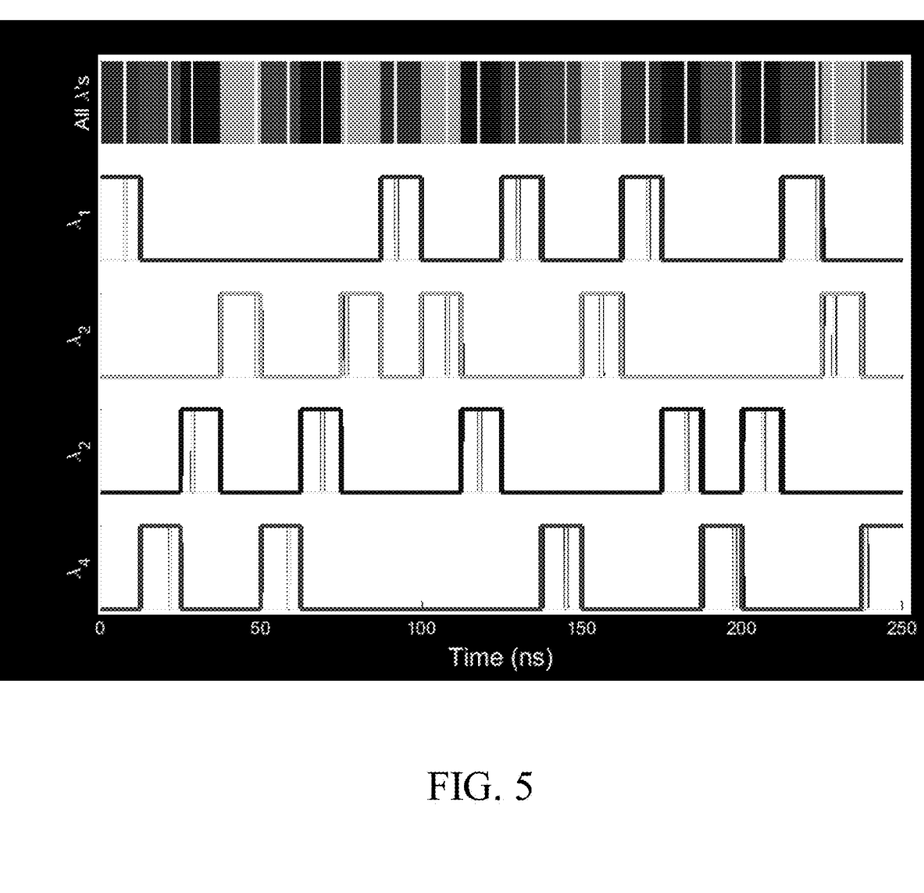
FIG. 5 is a graph of an optical transmitter output waveform according to various examples described herein.

FIG. 5 illustrates an example output transmitter waveform (e.g., output from the transmitter 10 or the transmitter 55). The output transmitter waveform includes four wavelengths $\lambda_1$, $\lambda_2$, $\lambda_3$, and $\lambda_4$. Embedded in each wavelength or color pulse train has a phase shift (e.g. binary phase shifting) that results in a pulse response after passing through the etalon similar to the test results shown in FIG. 6.

Figure 6:
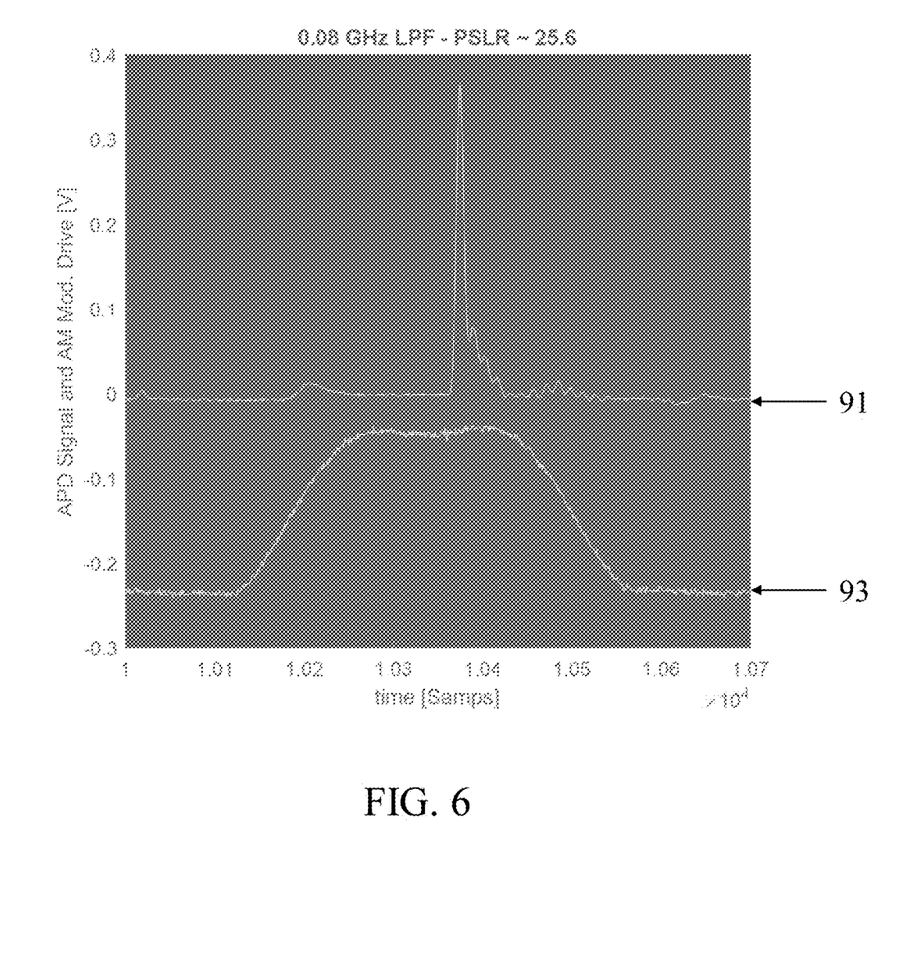
FIG. 6 is a graph of pulse response per color according to various examples described herein.

FIG. 6 shows the resultant measured pulse response 91 after being demodulated by the etalon (top) and corresponding amplitude waveform 93 of one of the wavelengths or colors (bottom). The bottom signal represents the detected signal when there is no etalon present.

Figure 7:
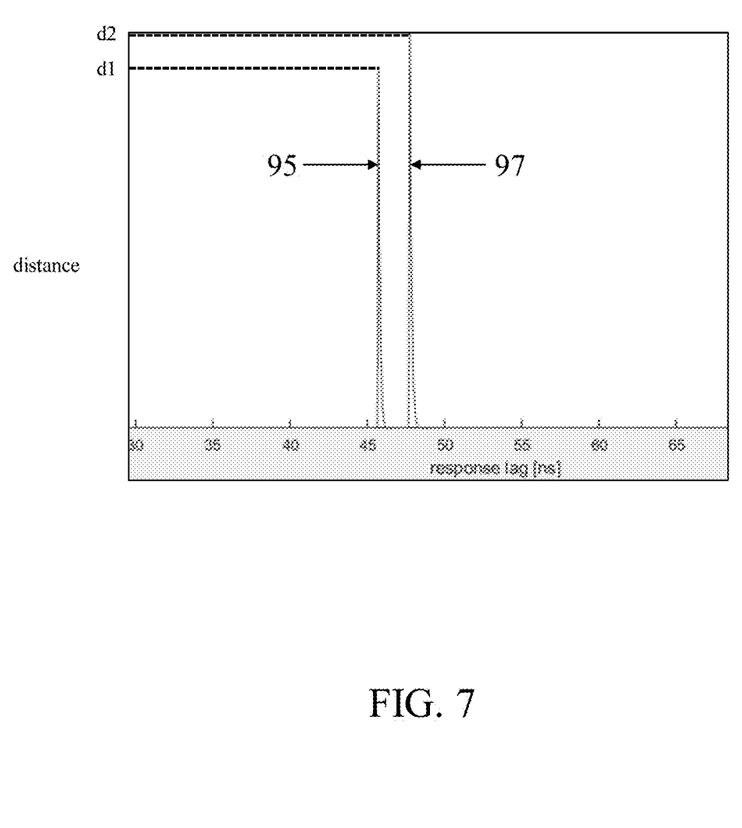
FIG. 7 is a graph of target distances according to various examples described herein.

For LIDAR or LADAR applications, FIG. 7 shows test data for two range-resolved targets, with a first target response 95 indicating a distance of d1 and a second target response 97 indicating a distance of d2. The vertical axis in FIG. 7 is in linear arbitrary units depicting the degree of correlation. The horizontal axis is response lag in nanoseconds.

Figure 8:
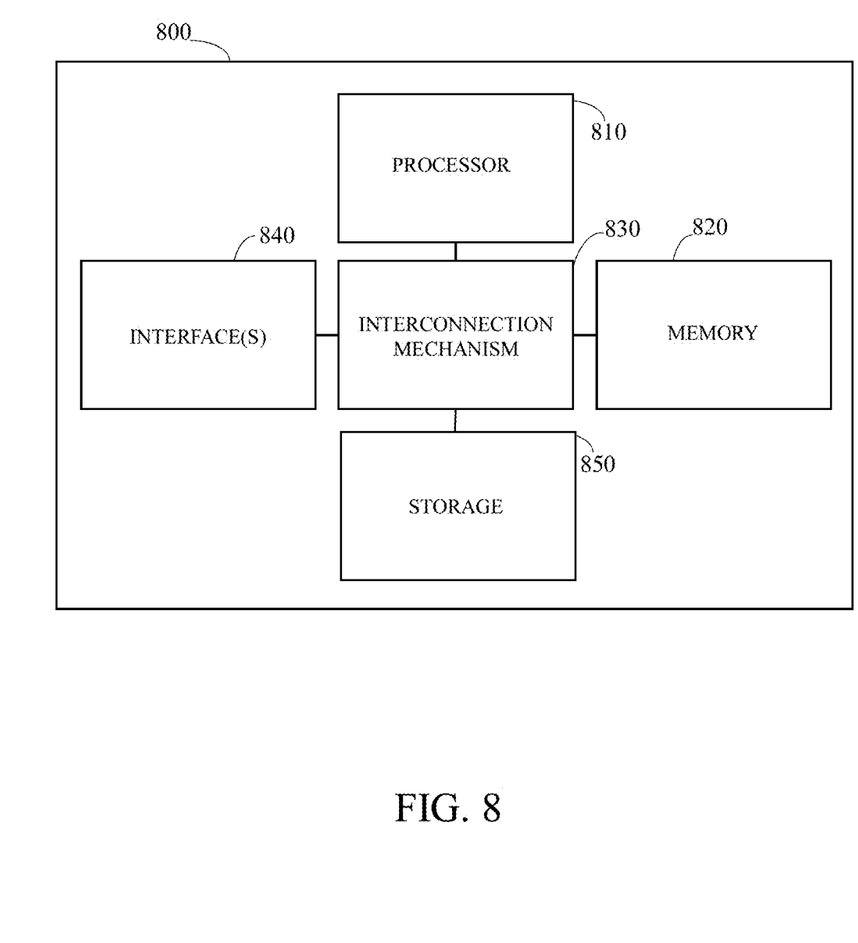
FIG. 8 is a functional block diagram of an example of a computing system that may be configured to implement various examples of the processes described herein.

FIG. 8 illustrates one example of a computing system 800 that may implement software routines corresponding to a control circuit or module, for example, the computer 98 as illustrated in FIG. 3, and/or other components. The computing system 800 may include a processor 810, data storage 850, a memory 820, and one or more interfaces 840, such as a system interface and/or a user interface. While not explicitly illustrated in FIG. 8, in certain examples the computing system 800 may be coupled to a power source. The power source may deliver power to one or more components of the computing system 800, as well as other components of an optical transmitter (e.g., the transmitter 10 or the transmitter 55) or an optical receiver (e.g., the receiver 18, the receiver 24, or the receiver 57).

In FIG. 8, the processor 810 is coupled to the data storage 850, memory 820, and the various interfaces 840. The memory 820 stores programs (e.g., sequences of instructions coded to be executable by the processor 810) and data during operation of the computing system 800. Thus, the memory 820 may be a relatively high performance, volatile, random access memory such as a dynamic random access memory ("DRAM") or static memory ("SRAM"). However, the memory 820 may include any device for storing data, such as a disk drive or other nonvolatile storage device. Various examples may organize the memory 820 into particularized and, in some cases, unique structures to perform the functions disclosed herein. These data structures may be sized and organized to store values for particular data and types of data.

The data storage 850 includes a computer readable and writeable data storage medium configured to store non-transitory instructions and other data, and can include non-volatile storage media, such as optical or magnetic disk, ROM or flash memory. The instructions may include executable programs or other code that can be executed by the at least one processor 810 to perform any of the functions described herein.

In various examples, the computing system 800 includes several interface components 840, such as a system interface and/or a user interface. Each of the interface components 840 is configured to exchange, e.g., send or receive, data with other components of the computing system 800 (and/or associated transmitter or receiver), or other devices in communication with the computing system 800. According to various examples, the interface components 840 may include hardware components, software components, or a combination of hardware and software components.

A user interface may include hardware and/or software components that allow a corresponding transmitter or receiver in which the computing system 800 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the computing system 800. Data received at the various interfaces may be provided to the processor 810, as illustrated in FIG. 8. Communication coupling (e.g., shown interconnection mechanism 830) between the processor 810, memory 820, data storage 850, and interface(s) 840 may be implemented as one or more physical busses in conformance with standard, proprietary, or specialized computing bus technologies.

The processor 810 performs a series of instructions that result in manipulated data that is stored in and retrieved from the data storage 850, as discussed above. In various examples, the series of instructions result in interpretation of the outputs from optical resonators as discussed above. Such instructions may correspond to commands for interpreting peaks and troughs of such output signals to determine phase, frequency, or amplitude changes (modulations) in an arriving optical signal, and/or recovering a data payload therefrom, as discussed herein.

The processor 810 may be any type of processor, multi-processor or controller, whether commercially available or specially manufactured. For instance, the processor may include a commercially available processor, such as a processor manufactured by INTEL, AMD, MOTOROLA, or FREESCALE. In some examples, the processor 810 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example, phase relationships are on the order of one wavelength of light, and a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. A non-line of sight optical signal receiver configured to receive and detect a complex, scattered, modulated optical signal received through a non-line of site propagation path from an optical transmitter, comprising:
   an optical resonator configured to receive the complex, scattered, modulated optical signal through the non-line of sight propagation path, and to convert complex, scattered, modulated optical signal to an intensity modulated signal; and
   a detector configured to convert the intensity modulated signal into an electrical signal, the electrical signal having an amplitude indicative of an intensity of the intensity modulated signal from the optical resonator, and to provide a detected signal.

2. The optical signal receiver of claim 1 wherein the optical receiver is implemented without one or more of a single mode fiber and adaptive focusing optics; and
   the optical resonator enables demodulation of complex, scattered, modulated optical signals with wavefront distortion without any local oscillators or mixers for measuring a phase change of the complex, scattered, modulated optical signal.

3. The optical signal receiver of claim 1 wherein the complex, scattered, modulated_optical signal is a phase modulated optical signal, and the optical resonator is an etalon configured to convert the phase modulated optical signal to the intensity modulated signal.

4. The optical signal receiver of claim 1 further comprising a tuning controller configured to tune the optical resonator by:
   altering a temperature of air in or around the optical resonator causing an optical thickness of the optical resonator to change,
   altering a temperature of a material in the optical resonator causing the optical thickness of the optical resonator to change,
   rotating the optical resonator to alter the optical thickness,
   applying a voltage to an electro-optic material in the optical resonator to alter the index of refraction of the electro-optic material,
   applying a voltage to one or more piezo elements that change in length to thereby change a cavity length of the optical resonator, and/or
   changing the cavity length by a mechanical movement or an application of pressure applied to one or more semi-reflective surfaces of the optical resonator.

5. The optical signal receiver of claim 1 further comprising:
   a receive telescope configured to receive the complex, scattered, modulated optical signal from the optical transmitter through the non-line of site propagation path, the optical resonator further configured to receive the complex, scattered, modulated optical signal from the receive telescope.

6. The optical signal receiver of claim 1 further comprising:
   a polarizing beam splitter configured to transmit the complex, scattered, modulated optical signal towards the optical resonator and reflect the intensity modulated optical signal from the optical resonator towards the detector.

7. A non-line of sight optical system comprising the optical signal receiver of claim 1 and further comprising the optical transmitter.

8. The optical system of claim 7 wherein the optical transmitter comprises:
   one or more wavelength master oscillators and one or more wavelength dispersive optical devices.

9. The optical system of claim 7 wherein the optical transmitter comprises:
   an optical source configured to provide an optical signal;
   at least one electro-optic modulator configured to receive a de-multiplexed optical signal and modulate an amplitude of the optical signal;
   a phase modulator configured to modulate a phase of the amplitude-modulated optical signal;

an optical amplifier configured to amplify the power of the phase-modulated optical signal; and a transmit telescope configured to receive the amplified optical signal and transmit the complex, scattered, modulated optical signal through the non-line of site propagation path.

10. The non-line of sight optical signal receiver of claim 1 wherein the optical signal receiver is further configured to receive and detect an optical signal from a scatterer, the optical transmitter being co-located with the optical signal receiver.

11. The non-line of sight optical signal receiver of claim 10 further comprising:
  a controller configured to calculate a distance from the optical signal receiver to the scatterer based on
  a correlation between the detected optical signal received from the scatterer and a known modulated waveform.

12. A non-line of sight optical signal receiver configured to receive and detect a complex modulated optical signal —received through a non-line of site propagation path from an optical transmitter, comprising:
  an optical resonator configured to receive the complex, scattered, modulated optical signal through the non-line of sight propagation path, and to convert complex modulated optical signal to an intensity modulated signal; and
  a detector configured to convert the intensity modulated signal into an electrical signal, the electrical signal having an amplitude indicative of an intensity of the intensity modulated signal from the optical resonator, and to provide a detected signal;
  a polarizing beam splitter configured to transmit the complex, scattered, modulated optical signal towards the optical resonator and reflect the intensity modulated optical signal from the optical resonator towards the detector;
  at least one dispersive optics element configured to receive the reflected intensity modulated optical signal from the optical resonator and disperse energy in the intensity modulated optical signal as a dispersed optical signal,
  wherein the detector is further configured to convert the dispersed optical signal into the electrical signal.

13. The optical signal receiver of claim 12 wherein the at least one dispersive optics element includes a diffraction grating having a spacing at the free spectral range of the optical resonator.

14. The optical signal receiver of claim 12 wherein the at least one dispersive optics element includes at least one dispersing prism.

15. A method of detecting a complex, scattered, modulated optical signal through a non-line of site propagation path, the method comprising:
  receiving, at an optical resonator, the complex, scattered, modulated optical signal through the non-line of sight propagation path from an optical transmitter;
  converting the complex, scattered, modulated optical signal to an intensity modulated signal;
  receiving the intensity modulated optical signal at a detector;
  converting the intensity modulated optical signal into an electrical signal, the electrical signal having an amplitude indicative of an intensity of the intensity modulated signal from the optical resonator; and
  providing a detected signal.

16. The method of claim 15 wherein the optical resonator is an etalon that demodulates one or more complex, scattered, modulated optical signals with wavefront distortion without any local oscillators or mixers for measuring a phase change of the complex, scattered, modulated optical signal.

17. The method of claim 15 further comprising tuning the optical resonator by:
  altering a temperature of air in or around the optical resonator causing an optical thickness of the optical resonator to change,
  altering a temperature of a material in the optical resonator causing the optical thickness of the optical resonator to change,
  rotating the optical resonator to alter the optical thickness,
  applying a voltage to an electro-optic material in the optical resonator to alter the index of refraction of the electro-optic material,
  applying a voltage to one or more piezo elements that change in length to thereby change a cavity length of the optical resonator, and/or
  changing the cavity length by a mechanical movement or an application of pressure applied to one or more semi-reflective surfaces of the optical resonator.

18. The method of claim 15 further comprising:
  transmitting, by a polarizing beam splitter, the complex, scattered, modulated optical signal towards the optical resonator; and
  reflecting, with the polarizing beam splitter, the intensity modulated optical signal from the optical resonator towards the detector.

19. The method of claim 15 further comprising:
  transmitting, by the optical transmitter being co-located with an optical signal receiver, an optical signal;
  receiving and detecting the optical signal; and
  calculating a distance from the optical signal receiver to a scatterer based on a time of delay between the optical transmitter transmitting the optical signal and the optical signal receiver receiving the signal.

20. A method of detecting a complex modulated optical signal through a non-line of site propagation path, the method comprising:
  receiving, at an optical resonator, the complex modulated optical signal through the non-line of sight propagation path from an optical transmitter;
  converting the complex modulated optical signal to an intensity modulated signal;
  receiving the intensity modulated optical signal at a detector;
  converting the intensity modulated optical signal into an electrical signal, the electrical signal having an amplitude indicative of an intensity of the intensity modulated signal from the optical resonator; and
  providing a detected signal;
  transmitting, by a polarizing beam splitter, the complex modulated optical signal towards the optical resonator; and
  reflecting, with the polarizing beam splitter, the intensity modulated optical signal from the optical resonator towards the detector;
  receiving the reflected intensity modulated optical signal from the optical resonator;
  dispersing energy in the intensity modulated optical signal as a dispersed optical signal; and
  converting the dispersed optical signal into the electrical signal.

* * * * *